United States Patent
Katayama

(10) Patent No.: US 7,289,579 B2
(45) Date of Patent: Oct. 30, 2007

(54) INFORMATION REPRODUCING APPARATUS USING MAXIMUM LIKELIHOOD DECODING METHOD

(75) Inventor: Tatsushi Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 10/882,329

(22) Filed: Jul. 2, 2004

(65) Prior Publication Data

US 2005/0008104 A1    Jan. 13, 2005

(30) Foreign Application Priority Data

Jul. 9, 2003    (JP) .............................. 2003-194311

(51) Int. Cl.
*H04L 27/06* (2006.01)
*H03M 13/03* (2006.01)

(52) U.S. Cl. ...................................... 375/341; 714/794

(58) Field of Classification Search ................ 375/316, 375/341, 262; 714/794, 746
See application file for complete search history.

(56) References Cited

U.S. PATENT DOCUMENTS 5,541,955 A * 7/1996 Jacobsmeyer ............... 375/222
5,729,517 A * 3/1998 Fujiwara et al. .......... 369/59.22
6,711,111 B2 * 3/2004 Okamoto et al. ........... 369/59.1
2003/0067998 A1   4/2003 Nakajima et al. ........... 375/341
2004/0064780 A1 * 4/2004 Ide .............................. 714/794

FOREIGN PATENT DOCUMENTS

JP    2003-141823 A    5/2003
JP    2003-151200 A    5/2003

* cited by examiner

*Primary Examiner*—Tesfaldet Bocure
(74) *Attorney, Agent, or Firm*—Fitzpatrick, Cella, Harper & Scinto

(57) ABSTRACT

An apparatus is provided in which a parameter of Viterbi decoding is adjusted on the basis of a metric difference for evaluation of PRML signal quality to increase the error rate even when using a medium on which recording is performed under a large-distortion condition. When a reproduced signal is binarized by maximum likelihood decoding such that a state transition sequence most probable to be correct of m kinds of state transition sequences from a first state at time n−1 to a second state at time n is selected, a metric difference between the most probable state transition sequence and a second most probable state transition sequence at a predetermined time is computed, and a parameter (a reference amplitude value or a metric) of a maximum likelihood decoder is corrected on the basis of the metric difference to optimize maximum likelihood decoding operation.

4 Claims, 12 Drawing Sheets

FIG. 4

| PATTERN NUMBER | DECODING PATTERN OF PATH A | DECODING PATTERN OF PATH B |
|---|---|---|
| 1 | 0110000 | 0111000 |
| 2 | 1110000 | 1111000 |
| 3 | 0110001 | 0111001 |
| 4 | 1110001 | 1111001 |
| 5 | 0000110 | 0001110 |
| 6 | 1000110 | 1001110 |
| 7 | 0000111 | 0001111 |
| 8 | 1000111 | 1001111 |

FIG. 8

| PATTERN NUMBER | PR IDEAL OUTPUT VALUE OF PATH A | PR IDEAL OUTPUT VALUE OF PATH B |
|---|---|---|
| 1 | 34310 | 35531 |
| 2 | 65310 | 66531 |
| 3 | 34311 | 35532 |
| 4 | 65311 | 66532 |
| 5 | 00134 | 01355 |
| 6 | 53134 | 53355 |
| 7 | 00135 | 01356 |
| 8 | 31135 | 32356 |

FIG. 9

| PATTERN NUMBER | REFERENCE AMPLITUDE VALUE (g) CORRECTED WHEN PATH A DECODED DATA IS DETECTED AND CORRECTION DIRECTION (h) | | REFERENCE AMPLITUDE VALUE (g) CORRECTED WHEN PATH B DECODED DATA IS DETECTED AND CORRECTION DIRECTION (h) | |
|---|---|---|---|---|
| 1 | g0 g1 g3 g4 | -1 | g1 g3 g5 | +1 |
| 2 | g0 g1 g3 g5 g6 | -1 | g1 g3 g5 g6 | +1 |
| 3 | g1 g3 g4 | -1 | g2 g3 g5 | +1 |
| 4 | g1 g3 g5 g6 | -1 | g2 g3 g5 g6 | +1 |
| 5 | g0 g1 g3 g4 | -1 | g0 g1 g3 g5 | +1 |
| 6 | g1 g3 g4 g5 | -1 | g3 g5 | +1 |
| 7 | g0 g1 g3 g5 | -1 | g0 g1 g3 g5 g6 | +1 |
| 8 | g1 g3 g5 | -1 | g2 g3 g5 g6 | +1 |

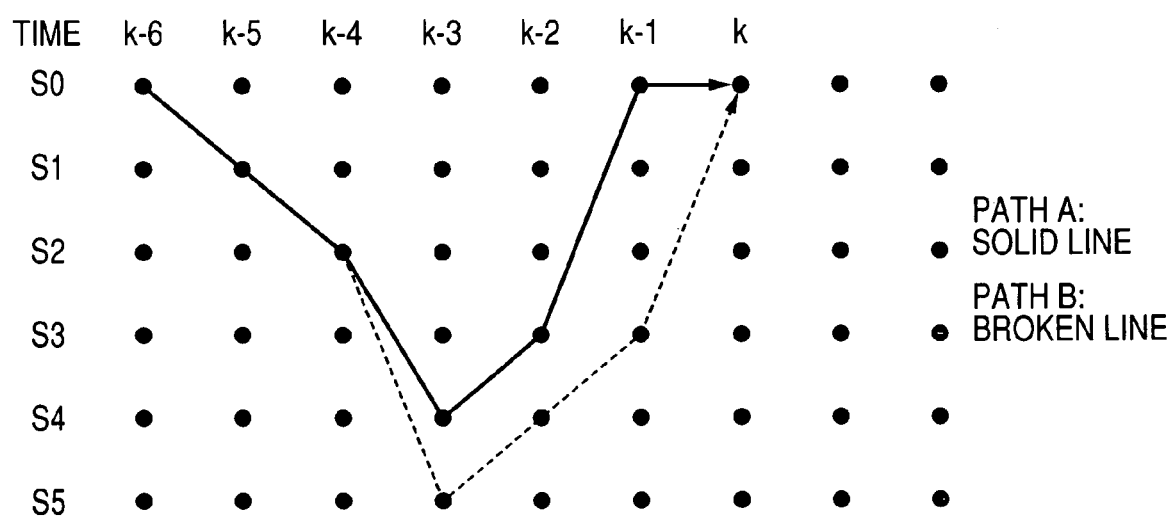

INFORMATION REPRODUCING APPARATUS USING MAXIMUM LIKELIHOOD DECODING METHOD

This application claims priority from Japanese Patent Application No. 2003-194311 filed on Jul. 9, 2003, which is hereby incorporated by reference.

BACKGROUND OF THE INVENTION

1. Field of the Invention

The present invention relates to an information reproducing apparatus that reproduces information from an information recording medium such as an optical disk, a magneto-optical disk, a compact disc (CD), or a CD-R.

2. Related Background Art

A partial Response Maximum likelihood (PRML) method is known as a signal processing method for optical information reproducing apparatuses including optical disk drives. In the PRML method, a reproduced signal is equalized by a PR method according to characteristics of a recording/reproduction system, and decoding processing for maximum likelihood decoding such as Viterbi decoding is performed to obtain data at a reduced error rate even if the reproduced signal has large intersymbol interference. Japanese Patent Application Laid-Open No. 2003-141823 discloses a method of evaluating signal quality in a reproduction system using PRML.

FIG. 10 shows the outline of this evaluation method. FIG. 10 is a trellis diagram showing state transition in PRML using PR (1, 2, 2, 1) as a PR characteristic. In the conventional method, decoded data corresponding to a predetermined path A or B in a path through which a transition from a state S0 at a time k–4 to state S5 at a time k in FIG. 10 is made is detected and metrics Ma and Mb of the paths A and B are generated from PR output values generated on the basis of a reproduced signal. Evaluation of signal quality is then performed by using the metric difference |Ma–Mb| between the generated metrics Ma and Mb. As the predetermined paths from which the above-described metric difference is detected, paths of the minimum Euclidean distance in PR (1, 2, 2, 1) for example are set. The paths shown in FIG. 10 are an example of paths of the minimum Euclidean distance. FIG. 11 shows reference amplitudes in PR (1, 2, 2, 1) with respect to the paths A and B in FIG. 10. As shown in FIG. 11, the values of reference amplitude in PR (1, 2, 2, 1) are seven values of 0 to 6. Therefore, the reference amplitude values corresponding to the path A are [0 1 3 5], and the reference amplitude values corresponding to the path B are [1 3 5 6].

Here, if the amplitude values of a reproduced signal by PR (1, 2, 2, 1) are [0.2 1.3 3.5 4.8], that is, when amplitude values indicated by P in FIG. 11 are obtained, the metrics of the paths A and B are as shown below.

$Ma = (0.0-0.2)^2 + (1.0-1.3)^2 + (3.0-3.5)^2 + (5.0-4.8)^2 = 0.42$ $Mb = (1.0-0.2)^2 + (3.0-1.3)^2 + (5.0-3.5)^2 + (6.0-4.8)^2 = 7.22$

From these Ma and Mb, the metric difference |Ma–Mb|=6.8.

In the PRML decoding process, when paths of the minimum Euclidean distance are detected and only the metric differences between the paths are statistically processed, a distribution such as shown in FIG. 12 is obtained. At this time, since the minimum Euclidean distance in PRML of PR (1, 2, 2, 1) is 10, the central value of the distribution is 10.

In the above-described conventional method, statistical processing of the above-described metric difference is performed and a signal evaluation index is generated from a mean value and a standard deviation or the like thereof to enable evaluation of the signal quality.

Further, the servo control value and the equalization characteristics of a waveform equalizer or the like are adjusted by using the quality evaluation index to optimize reproduction quality.

However, although the above publication describes evaluation of signal quality from the PRML metric difference and an apparatus for adjusting a servo control value and a recording power control value using the above described evaluation index with respect to the above-described conventional method, no description has been made of optimization of any Viterbi decoder for generating a decoded signal.

A reproduced signal has a distortion such as asymmetry, and a distortion component that cannot be removed by optimization of a servo system or optimization of an equalizer only cannot be prevented from being mixed in an input signal to a Viterbi decoder. This distortion component causes an error in metric to hinder decoding processing from being correctly performed.

SUMMARY OF THE INVENTION

An object of the present invention is to provide an apparatus which adjusts Viterbi decoding parameters on the basis of the metric difference for evaluation of PRML signal quality and which is therefore capable of decreasing the error rate with respect to a medium on which recording is performed under a large-distortion condition.

To achieve the above-described object, according to the present invention, there is provided an information processing apparatus comprising a maximum likelihood decoder which binarizes a reproduced signal by maximum likelihood decoding in which a state transition sequence most probable to be correct of m kinds of state transition sequences from a first state at time k–n to a second state at time k is selected, a computing device which computes the metric difference between the most probable state transition sequence and a second most probable state transition sequence at a predetermined time, and a parameter adjustment means of correcting a parameter of the maximum likelihood decoder on the basis of the metric difference to optimize maximum likelihood decoding operation.

BRIEF DESCRIPTION OF THE DRAWINGS

FIG. 4 is a diagram schematically showing decoding patterns from which a metric difference is detected;

FIG. 8 is a diagram for explaining PR output values corresponding to predetermined decoding patterns;

FIG. 9 is a diagram for explaining correction of reference amplitude values in the Viterbi decoder;

FIG. 15 is a diagram showing the operation of the Viterbi decoder shown in FIG. 13; and FIG. 16 is a diagram showing the operation of the Viterbi decoder shown in FIG. 13.

DESCRIPTION OF THE PREFERRED EMBODIMENTS

First Embodiment

A first embodiment of an information reproducing apparatus in accordance with the present invention will be described with reference to the drawings.

Figure 1:
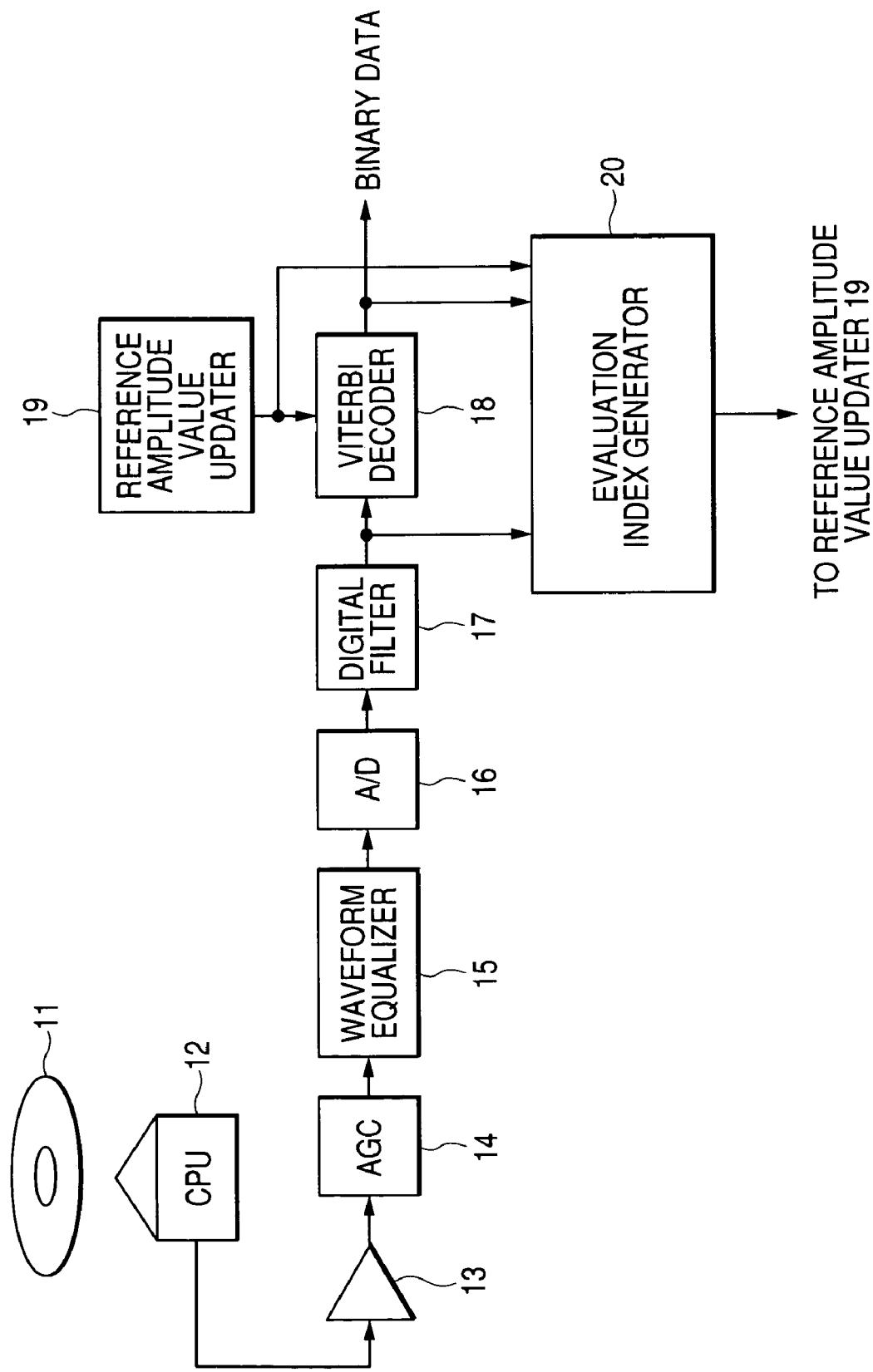
FIG. 1 is a block diagram showing a first embodiment of an information processing apparatus in accordance with the present invention.

Referring to FIG. 1, an optical disk indicated by 11 is a medium on which information is optically recorded and from which information is optically reproduced. An optical head 12 detects a signal from an optical disk to obtain a reproduced signal. A preamplifier 13 amplifies an analog reproduced signal from the optical head. An automatic gain control (AGC) 14 performs gain control so that the signal amplitude is constant. A waveform equalizer 15 performs waveform shaping. An A/D converter 16 samples the analog reproduced signal to convert the reproduced analog signal into a digital reproduced signal.

A digital filter 17 equalizes the converted digital reproduced signal such that the signal has a desired PR characteristic. A Viterbi (maximum likelihood) decoder 18 computes metrics from the PR-equalized signal to generate decoded data. An evaluation index generator 20 generates an evaluation index from the metric difference between predetermined decoding patterns of the Viterbi decoding on the basis of the signal from the digital filter 17. For the generation of the evaluation index, a known method such as disclosed in Japanese Patent Application Laid-Open No. 2003-141823 referred to above or Japanese Patent Application Laid-Open No. 2003-151220 can be used. The outline of the generation of the evaluation index is as described above. A reference amplitude value updater 19 sets reference amplitude values used for Viterbi decoding to most suitable values corresponding to the reproduced signal on the basis of a signal from the evaluation index generator 20.

Figure 2:
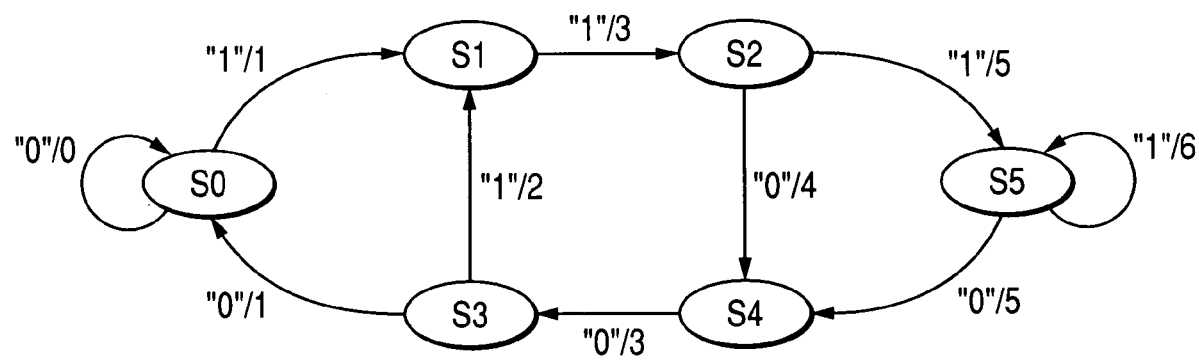
FIG. 2 is a state transition diagram of a Viterbi decoding of PR (1, 2, 2, 1)

The operation will now be described with respect to Viterbi decoding operation. FIG. 2 shows a Viterbi decoding state transition diagram with respect to PR (1, 2, 2, 1). Description will be made of a case where RLL (1, 7) code is used as a recording code and where data is decoded after being subjected to NRZI conversion. The decoding process in the case of use of PR (1, 2, 2, 1) method can be represented by transitions between six states as shown in FIG. 2.

Let states S at different times: for S (0, 0, 0) as S0; for S (0, 0, 1) as S1; for S (0, 1, 1) as S2; for S (1, 0, 0) as S3; for S (1, 1, 0) as S4; and for S (1, 1, 1) as S5.

Figure 3:
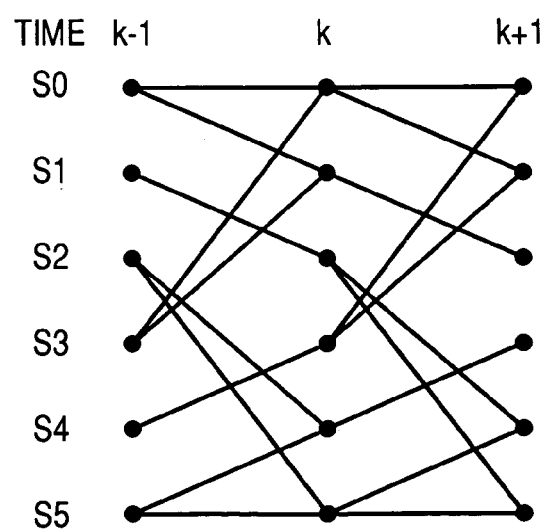
FIG. 3 is a trellis diagram of the Viterbi decoding of PR (1, 2, 2, 1)

Incidentally, the expression of state S $(d_{k-2}, d_{k-1}, d_k)$ employed herein is intended to mean that decoded data at the present time is $d_k$, decoded data one time before is $d_{k-1}$, and decoded data two times before is $d_{k-2}$. Further, an ideal sample value according the decoded data at the time of each transition and PR (1, 2, 2, 1) is expressed as $d_k/P_k$;

FIG. 3 is a trellis diagram obtained by developing the state transition diagram of FIG. 2 in the time-axis direction.

In Viterbi decoding, path metrics $m_0[k]$ to $m_5[k]$ in the states S0 to S5 at time k are expressed by using metrics $m_0[k-1]$ to $m_5[k-1]$ in the predetermined states at time k−1 and an actual PR output value y[k] at time k according to the trellis diagram shown in FIG. 3, as shown below.

The PR output value is a value output from the digital filter 17 shown in FIG. 1.

$$m_0[k] = \min\{m_0[k-1]+(y[k]-a_0)^2, m_3[k-1]+(y[k]-a_1)^2\}$$

$$m_1[k] = \min\{m_0[k-1]+(y[k]-a_1)^2, m_3[k-1]+(y[k]-a_2)^2\}$$

$$m_2[k] = m_1[k-1]+(y[k]-a_3)^2$$

$$m_3[k] = m_4[k-1]+(y[k]-a_3)^2$$

$$m_4[k] = \min\{m_5[k-1]+(y[k]-a_5)^2, m_2[k-1]+(y[k]-a_4)^2\}$$

$$m_5[k] = \min\{m_5[k-1]+(y[k]-a_6)^2, m_2[k-1]+(y[k]-a_5)^2\} \quad (1)$$

In equations (1), $a_0$ to $a_6$ denote reference amplitude values.

In these equations, the reference amplitude values denote an ideal sample value of PR (1, 2, 2, 1).

In states S0, S1, S4, and S5, since two paths are confluent at each time, one of the two confluent paths having a smaller path metric value is selected as a surviving path.

Further, at the time of each of transitions from the states at time k−1 to the states at time k made as shown in the trellis diagram of FIG. 3, the Euclidean distance between the ideal sample value of PR (1, 2, 2, 1) determined by the transition and the output value obtained as a result of PR (1, 2, 2, 1) processing of the actual reproduced signal is added as a branch metric. In equations (1), the term $(y[k]-a_n)^2$ is a branch metric representing the probability of correctness of the state transition at each time. In Viterbi decoding, metric values are computed by equations (1) at each time and paths more probable to be correct are selected at the confluence points, thereby outputting decoded data corresponding to the most probable path in a predetermined section. Here, each path is a state transition history, i.e., a state transition sequence in a predetermined section.

Incidentally, the ideal sample values of PR (1, 2, 2, 1) are seven values of 0, 1, 2, 3, 4, 5 and 6.

Accordingly, the reference amplitude values of Viterbi decoding are ideally the values 0 to 6. However, in a case where PR (1, 2, 2, 1) output fluctuates due to a distortion or the like in the reproduced signal, when the ideal reference amplitude values are used, an error in metric may occur to cause a deterioration in performance of Viterbi decoding.

Accordingly, in the Viterbi decoder 18 of the apparatus in accordance with the present invention, control is performed such that the reference amplitude values are optimized according to the reproduced signal.

The following is a method for metric computation in the Viterbi decoder 18 in this embodiment.

$$m_0[k]=\min\{m_0[k-1]+(y[k]-g_0)^2, m_3[k-1]+(y[k]-g_1)^2\}$$

$$m_1[k]=\min\{m_0[k-1]+(y[k]-g_1)^2, m_3[k-1]+(y[k]-g_2)^2\}$$

$$m_2[k]=m_1[k-1]+(y[k]-g_3)^2$$

$$m_3[k]=m_4[k-1]+(y[k]-g_3)^2$$

$$m_4[k]=\min\{m_5[k-1]+(y[k]-g_5)^2, m_2[k-1]+(y[k]-g_4)^2\}$$

$$m_5[k]=\min\{m_5[k-1]+(y[k]-g_6)^2, m_2[k-1]+(y[k]-g_5)^2\} \quad (2)$$

In these equations, $g_0$ to $g_6$ denote reference amplitude values updated according the state of the reproduced signal.

Further, it is assumed here that, also at the time of computation of the metric difference in the evaluation index generator 20, the metric values of state transition sequences are computed by equations (2) shown above.

Next, the operation of the reference amplitude value updater 19 will be described. In the apparatus of this embodiment, the reference amplitude values in equations (2) shown above are updated on the basis of the signal from the evaluation index generator 20.

The evaluation index generator 20 is supplied with the decoded data from the Viterbi decoder 18 and the PR (1, 2, 2, 1) output, and detects the metric difference when the decoded data sequence is one of predetermined patterns. As the predetermined patterns, combinations of patterns giving the minimum Euclidean distance 10 in PR (1, 2, 2, 1) Viterbi decoding are set, as shown in FIG. 4.

Figure 5:
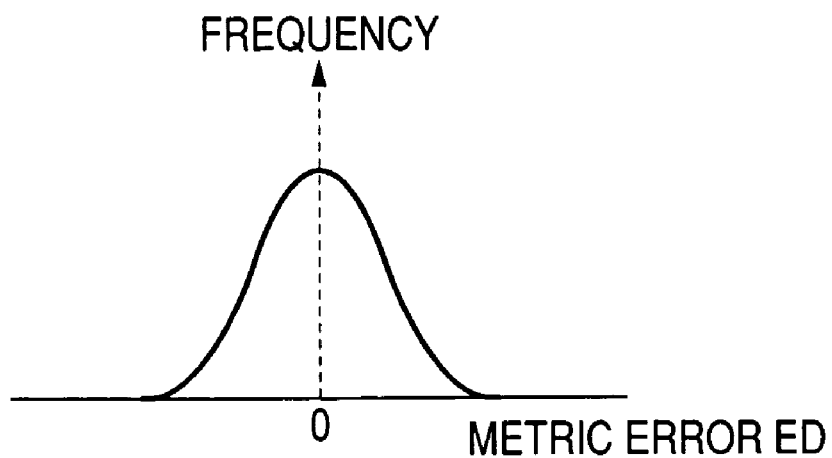
FIG. 5 is a diagram showing a distribution of the metric difference.
Figure 12:
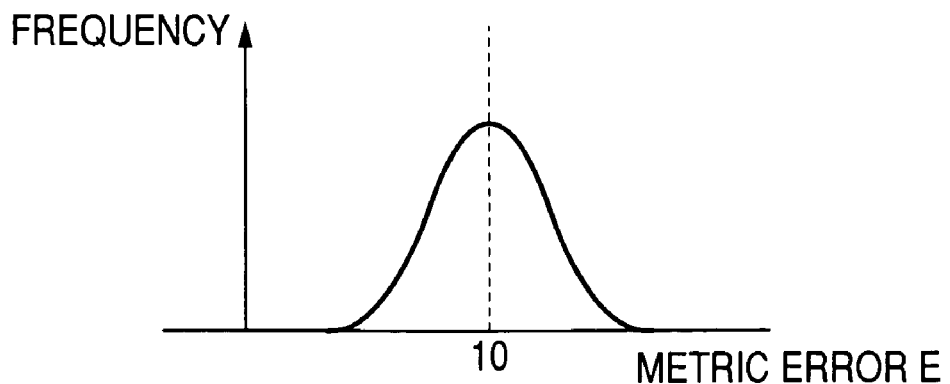
FIG. 12 is a diagram showing a distribution of a metric difference generated by an evaluation index generator.

In the evaluation index generator 20, when the decoded data from the Viterbi decoder 18 coincides with any one of the patterns shown in FIG. 4, the metric difference (likelihood difference) E is computed from the metric (likelihood) of the path A and the metric (likelihood) of the path B. Since the Euclidean distance between the path A and the path B shown in FIG. 4 is 10, the distribution of the metric difference E is as represented by a normal distribution with a mean value 10, as shown in FIG. 12. In this case, ED (=E−10) is assumed to be a metric error for simplification of subsequent computation, and the reference amplitude values are updated on the basis thereof. FIG. 5 shows the distribution of metric error ED.

Further, the reference amplitude values to be updated are set as described below.

Figure 6:
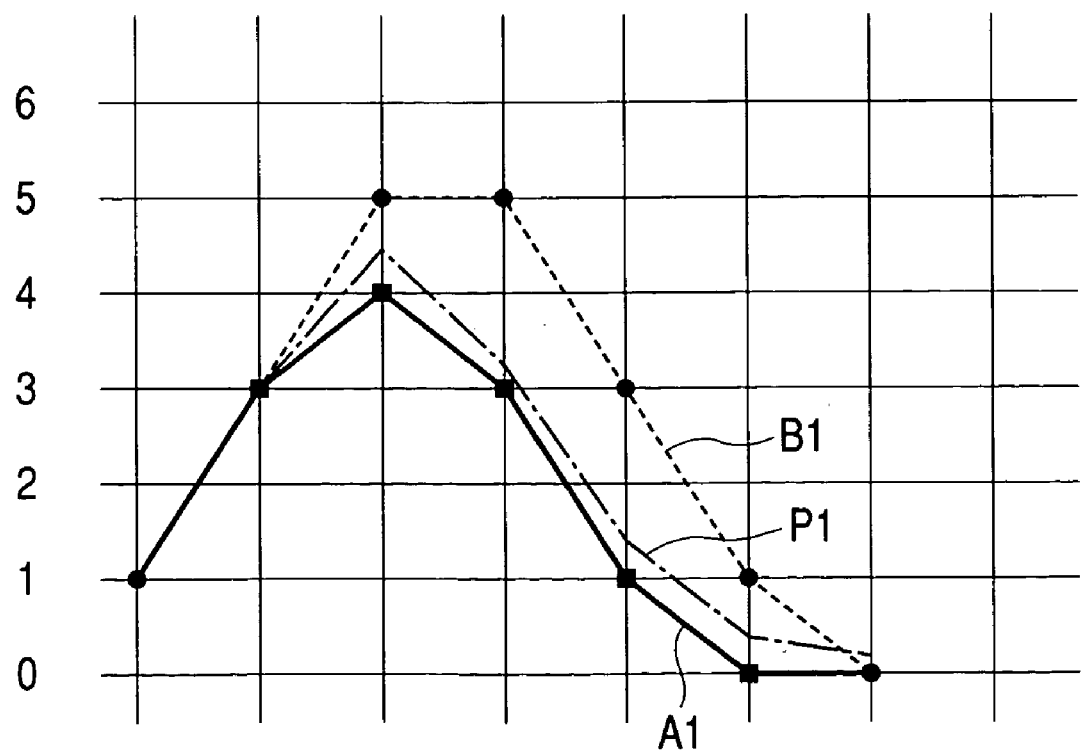
FIG. 6 is a diagram showing the relationship between ideal sample values of PR (1, 2, 2, 1) and actual waveform output values.

Signals sequences A1 and B1 shown in FIG. 6 are PR (1, 2, 2, 1) output values respectively corresponding to the path A and the path B in the pattern 1 shown in FIG. 4. Moreover, P1 is a PR (1, 2, 2, 1) output value signal sequence obtained from the actual reproduced signal. Here, it is assumed here that the data decoded in the Viterbi decoder 18 coincides with the path A in the pattern 1. At this time, the ideal signal sequence of PR (1, 2, 2, 1) corresponds to A1 of FIG. 6.

Under the above-described conditions, the evaluation index generator 20 computes the metric difference E. The metrics of the path A and the path B are as shown below.

$$Ma=(4.0-4.3)^2+(3.0-3.1)^2+(1.0-1.3)^2+(0.0-0.4)^2=0.35$$

$$Mb=(5.0-4.3)^2+(5.0-3.1)^2+(3.0-1.3)^2+(1.0-0.4)^2=7.35$$

Accordingly, the metric E is as follows.

$$E=|Ma-Mb|=7$$

Also, the metric error ED is as follows.

$$ED=E-10=-3$$

Ideally, metric error $ED_{A1}=0$. In actuality, however, the PR (1, 2, 2, 1) output value is shifted from the ideal value A1 due to noise, distortion or the like in the reproduced signal, as shown in the signal sequence P1 in FIG. 6, thus causing metric error ED.

Here, the signal sequence A1 corresponding to the decoded data in the path A in the pattern 1 shown in FIG. 4 relates to four output values 0, 1, 3 and 4 which are ideal sample values (reference amplitude values), as indicated by symbols ■ in FIG. 6. Therefore, the relating reference amplitude values 0, 1, 3 and 4 are corrected according to the metric error ED when the path A in the pattern 1 is detected as decoded data, thereby minimizing the metric error ED.

Figure 7A:
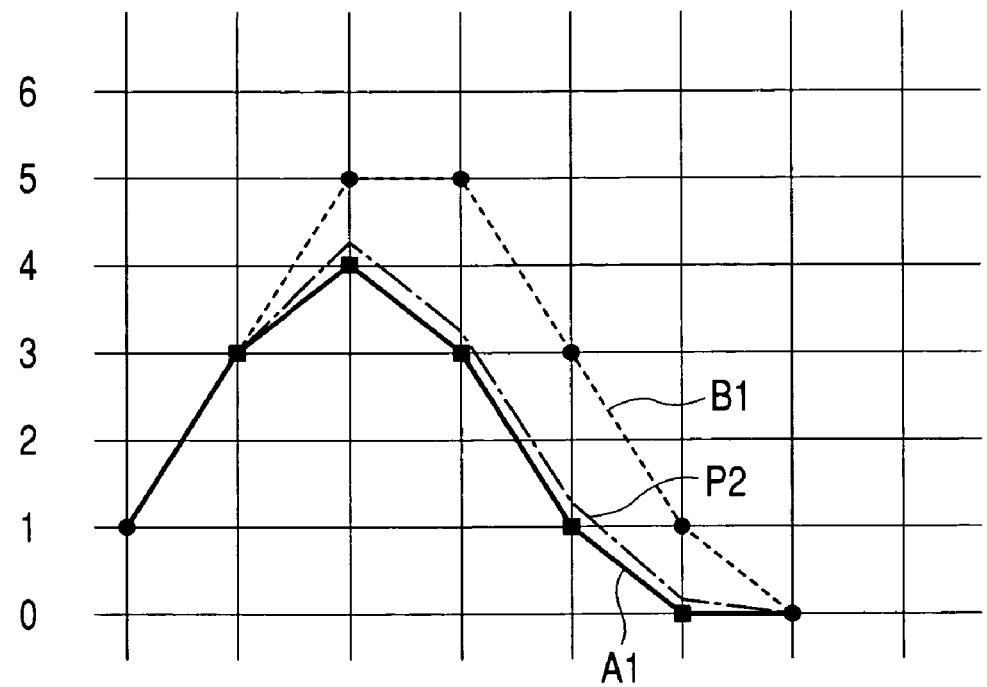
FIGS. 7A and 7B are diagrams for explaining changes in PR output.
Figure 7B:
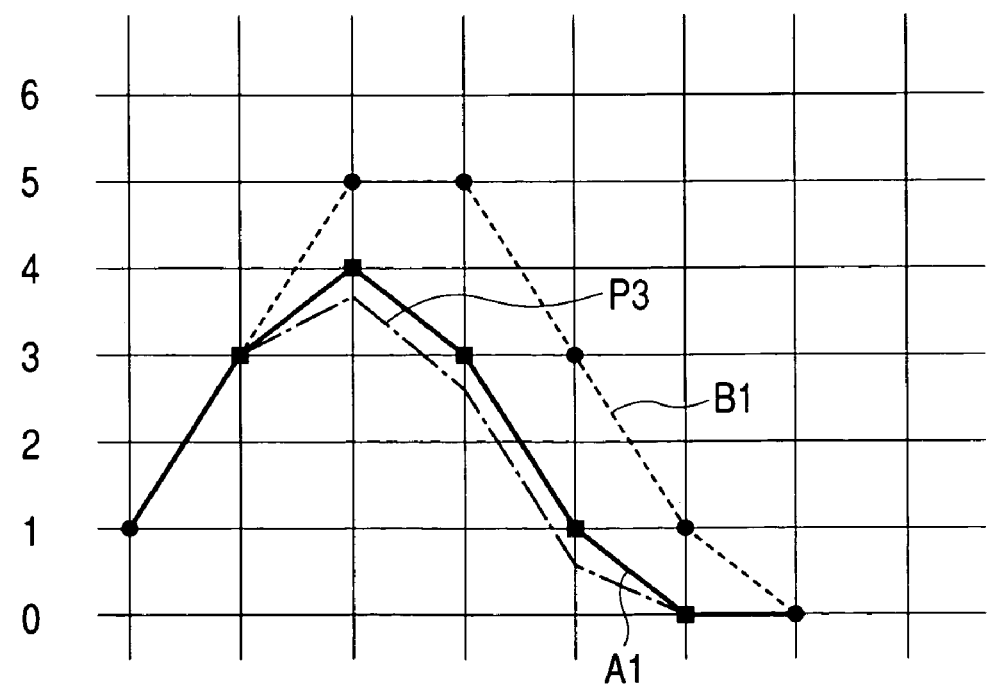

Correction of the reference amplitude values will be outlined with reference to FIGS. 7A and 7B. Each of FIGS. 7A and 7B shows ideal sample values A1 of PR (1, 2, 2, 1) and actual PR output values in a case where the path A in the pattern 1 shown in FIG. 4 is detected as decoded data from Viterbi decoder 18.

P2 in FIG. 7A indicates PR output values obtained from the actual reproduced signal from a certain medium. Metric error ED at this time can be obtained as shown below.

$$Ma=(4.0-4.1)^2+(3.0-3.1)^2+(1.0-1.1)^2+(0.0-0.1)^2=0.04$$

$$Mb=(5.0-4.1)^2+(5.0-3.1)^2+(3.0-1.1)^2+(1.0-0.1)^2=8.84$$

Accordingly, the metric difference E is as follows.

$$E=|Ma-Mb|=8.8$$

Also, the metric error ED is as follows.

$$ED=E-10=-1.2$$

P3 in FIG. 7B indicates PR output values obtained from the actual reproduced signal from another medium of different characteristics. Metric error ED in this case can be obtained as shown below.

$$Ma=(4.0-3.7)^2+(3.0-2.8)^2+(1.0-0.6)^2+(0.0-0.0)^2=0.29$$

$$Mb=(5.0-3.7)^2+(5.0-2.8)^2+(3.0-0.6)^2+(1.0-0.0)^2=13.29$$

Accordingly, the metric difference E is as follows.

$$E=|Ma-Mb|=13$$

Also, the metric error ED is as follows.

$$ED=E-10=3$$

Thus, the metric error ED is a positive value.

When the metric error ED is negative as shown in FIG. 7A, the actual PR output P2 has larger values in comparison with the ideal sample values A1, i.e., values closer to the path B. On the other hand, when the metric error ED is positive as shown in FIG. 7B, the actual PR output P3 has smaller values in comparison with the ideal sample values A1, i.e., reproduced waveform PR output P2 has values close to the path A but remote from the path B.

On the other hand, although not shown in the figure, when decoded data corresponding to the path B in the pattern 1 is detected, and when the metric error ED is negative, the actual PR output has smaller values in comparison with the ideal sample values B1, i.e., values closer to the path A. When the metric error ED is positive, the actual PR output has larger values in comparison with the ideal sample values, i.e., values close to the path B but remote from the path A.

Thus, correction is made in different directions depending on to the detected path and the positive or negative nature of the metric error.

Therefore, data on the direction of correction with respect to each of the corresponding paths is held in a table or the like in advance.

The amount of correction and the direction of correction of the reference amplitude values are set according to the metric error and the reference amplitude values are successively corrected to minimize the metric error ED.

FIG. 8 shows the ideal sample values of PR (1, 2, 2, 1) corresponding to the path A and the path B in each pattern shown in FIG. 4. Since the relating ideal sample values vary with depending on the patterns and the paths as shown in FIG. 8, levels g for the reference amplitude values by which correction is made with respect to each of the paths A and B in the patterns and a coefficient h indicating the direction of correction are set as shown in FIG. 9.

This may be defined according to the modulation method and the PR method. That is, the present invention is also applicable to PR characteristics such as PR (1, 2, 1), PR (1, 0, −1) and so on other than PR (1, 2, 2, 1) in this embodiment.

The reference amplitude value updater 19 selects the reference amplitude values to be updated from the table shown in FIG. 9 on the basis of the decoding pattern signal and the metric difference E detected by the evaluation index generator 20. Further, the reference amplitude value updater 19 computes the metric error ED from the metric difference E and multiplies the metric error ED by an updating coefficient a to update the reference amplitude values.

$$g_n[k]=g_n[k-1]+(h \cdot a \cdot ED) \quad (3)$$

Incidentally, in equation (3), $g_n$ (n is an integer of 0 to 6) corresponds to each of the reference amplitude values in equations (2). Further, as initial values for the reference amplitude values, the following values may be set as the corresponding ideal sample values of PR (1, 2, 2, 1):

$g_0=0.0, g_1=1.0, g_2=2.0, g_3=3.0, g_4=4.0, g_5=5.0, g_6=6.0$.

The updated reference amplitude values g are used for metric computation in the Viterbi decoder 18 and also for computation of the metric difference in the evaluation index generator 20.

As the reference amplitude values g are sequentially updated by the above-described method, they are converged on values according to the reproduced signal. For example, in the case of application to the reproduced signal shown in FIG. 6, the following values result.

$g_0=0.4, g_1=1.3, g_2=2.1, g_3=3.1, g_4=4.3, g_5=5.2, g_6=6.1$.

When the above-described reference amplitude values are applied to the reproduced signal shown in the signal sequence P1 in FIG. 6, the reference amplitude values $g_0$, $g_1$, $g_3$ and $g_4$ relating to the signal sequence P1 are corrected to optimum values corresponding to the reproduced signal, thereby reducing the likelihood error.

While a case where the reference amplitude values are subsequently updated according to predetermined patterns has been described, the reference amplitude values may be corrected by a method described below. That is, decoding processing is executed for a certain period of time; the metric difference is computed if some of the predetermined patterns shown in FIG. 4 are detected; and metric difference information is held with respect to each of the predetermined patterns. When a predetermined number of items of metric difference information are obtained, statistical processing is performed with respect to each pattern, and the reference amplitude values relating to path metric computation with respect to each of the predetermined patterns are corrected on the basis of the metric difference obtained as a result of statistical processing.

In the apparatus according to this embodiment, the reference amplitude values are corrected on the basis of metric information used in the decoding process for Viterbi decoding and, therefore, occurrence of error can be suppressed even if the state of the reproduced signal becomes deteriorated.

Second Embodiment

A second embodiment of an information reproducing apparatus in accordance with the present invention will be described with reference to the drawings. In the apparatus of this embodiment, the path metric value of the Viterbi decoder 30 is corrected on the basis of the metric difference information from the evaluation index decoder.

Figure 13:
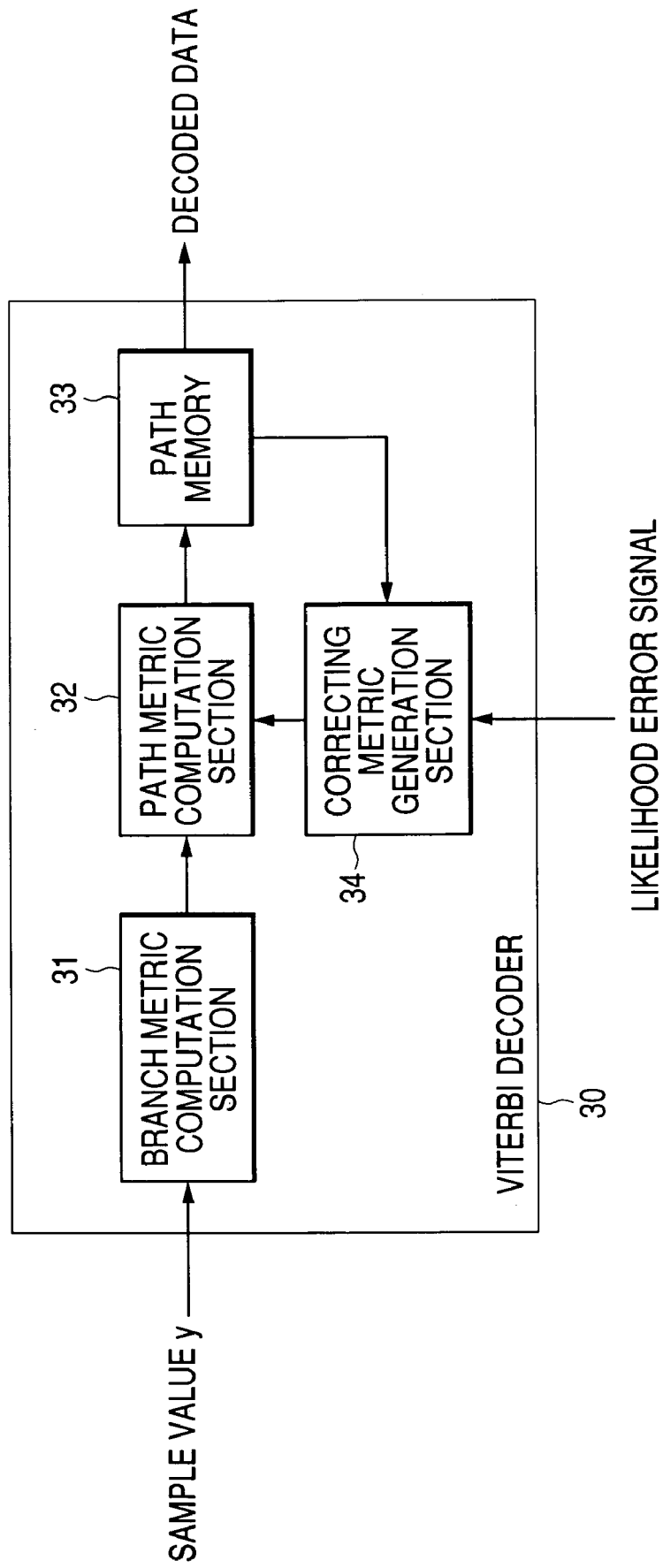
FIG. 13 is a diagram for explaining the configuration of a Viterbi decoder in a second embodiment of the information processing apparatus in accordance with the present invention.

FIG. 13 shows the Viterbi decoder 30 of the apparatus according to the present invention.

Referring to FIG. 13, a branch metric computation section 31 computes a branch metric at each one sampling time. A path metric computation section 32 updates the path metric value by adding the branch metric value to the metric value in each state one time before. Further, in the case of confluence of a plurality of paths, the path metric computation section 32 compares the path metric values to select a more probable one of the paths. A path memory 33 is provided. The path memory 33 is updated on the basis of information generated in the path metric computation section 32. A correcting metric generation section 34 refers to the path memory and adds a correcting value on the basis of metric error information at the time of path metric computation if a particular pattern is detected in the path memory.

The operation of the apparatus in accordance with the present invention will now be described.

As described with reference to the first embodiment, when one of predetermined patterns occurs in the evaluation index generator 20, the metric difference E is computed. Information on the computed metric difference is output to the correcting metric generation section 34 together with pattern information.

In the correcting metric generation section 34, the metric difference information is subjected to averaging processing on the basis of the pattern information with respect to each pattern. As the predetermined patterns, sixteen patterns corresponding to the path A and the path B in the patterns shown in FIG. 4 are set. FIG. 4 shows patterns giving the minimum Euclidean distance 10 in PR (1, 2, 2, 1), as described above.

Figure 14B:
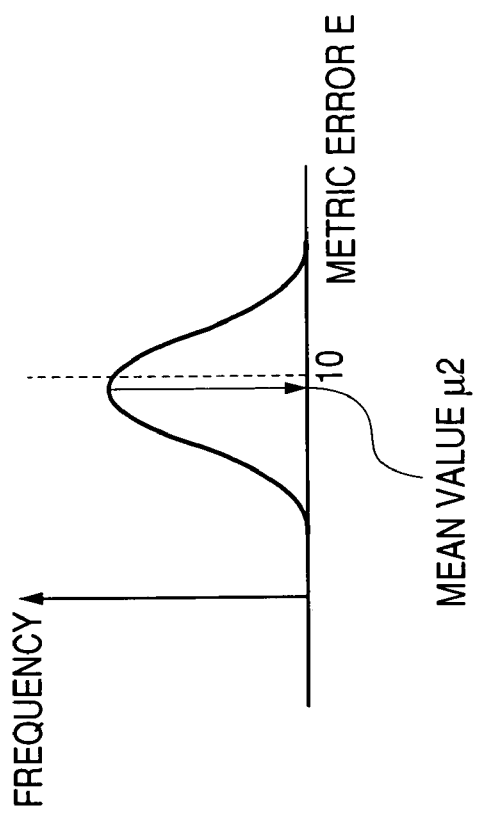
FIGS. 14A and 14B are diagrams schematically showing metric difference distributions corresponding to predetermined patterns.
Figure 14A:
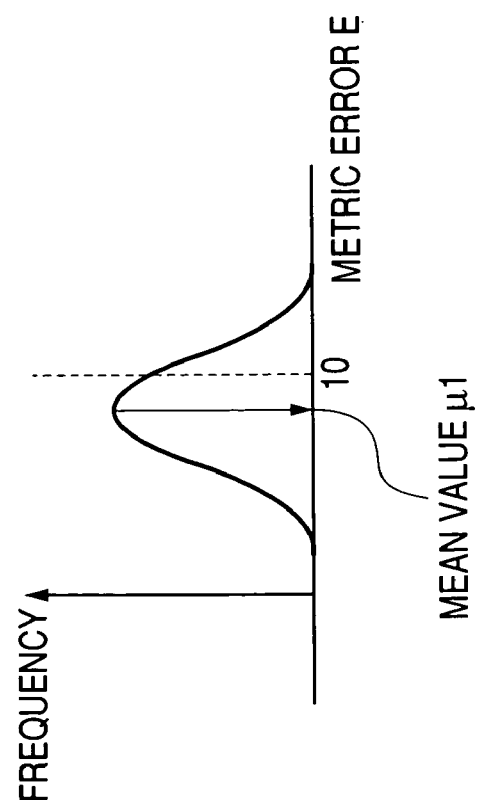

FIG. 14A shows the distribution of the metric difference between the metrics of signal sequences A1 and B1 with respect to the signal sequence P1 shown in FIG. 6, and FIG.

14B shows the distribution of the metric difference between the metrics of signal sequences A1 and B1 with respect to the signal sequence P2 shown in FIG. 7A. Distributions such as shown in FIGS. 14A and 14B are detected with respect to all the patterns shown in FIG. 4.

In the correcting metric generation section 34, a correcting metric value is generated from the mean value of the metric difference distribution with respect to each of the above-described patterns. Here, each pattern in FIG. 4 is a pattern for the minimum Euclidean distance 10. Accordingly, the metric difference distribution has a peak in the vicinity of the metric difference 10, as shown in FIGS. 14A and 14B.

In the correcting metric generation section 34, a correcting value γ is computed on the basis of the metric difference distributions shown in FIGS. 14A and 14B.

$$\gamma = \beta(\mu - 10)$$

where β is a predetermined coefficient.

When the decoding operation is performed in the Viterbi decoder 30 shown in FIG. 13, the path memory 33 is referred to and determination is made as to whether or not there is a possibility of occurrence of a path corresponding to each one of the patterns shown in FIG. 4.

FIG. 15 is a trellis diagram of the path corresponding to the pattern 1 shown in FIG. 4. Further, FIG. 16 shows the contents of the path memory for the states S0 and S3 at time k−1.

Referring to the path memory, two paths confluent in the state S0 at time k, i.e., the paths shown in FIG. 15, coincide with the decoding pattern in the pattern 1 shown in FIG. 4.

Therefore, when the contents of the path memory for the states S0 and S3 at time k−1 are the patterns shown in FIG. 16, the correcting metric value r corresponding to the path A and the path B in the pattern 1 generated in the correcting metric generation section 34 is set and path metrics are computed in the path metric computation section 32. In the path metric computation section 32, path metrics are computed by equations (4). Since in this case the metric values of two paths confluent in S0 are corrected, the correcting value is set in $k_1$ and $k_2$ in equations (4). If the predetermined pattern is detected by referring to the path memory at any of the other confluence points, the correcting value γ generated in the correcting metric generation section 34 is set as the correcting value $k_j$ (j =1, . . . 8). In the case of any of the patterns other than the predetermined pattern, correcting value $k_j$=0.

$$m_0[k] = \min\{m_0[k-1] + (y[k]-a_0)^2 + k_1, m_3[k-1] + (y[k]-a_1)^2 + k_2\}$$

$$m_1[k] = \min\{m_0[k-1] + (y[k]-a_1)^2 + k_3, m_3[k-1] + (y[k]-a_2)^2 + k_4\}$$

$$m_2[k] = m_1[k-1] + (y[k]-a_3)^2$$

$$m_3[k] = m_4[k-1] + (y[k]-a_3)^2$$

$$m_4[k] = \min\{m_5[k-1] + (y[k]-a_5)^2 + k_5, m_2[k-1] + (y[k]-a_4)^2 + k_6\}$$

$$m_5[k] = \min\{m_5[k-1] + (y[k]-a_6)^2 + k_7, m_2[k-1] + (y[k]-a_5)^2 + k_8\}$$

(4)

Figure 10:
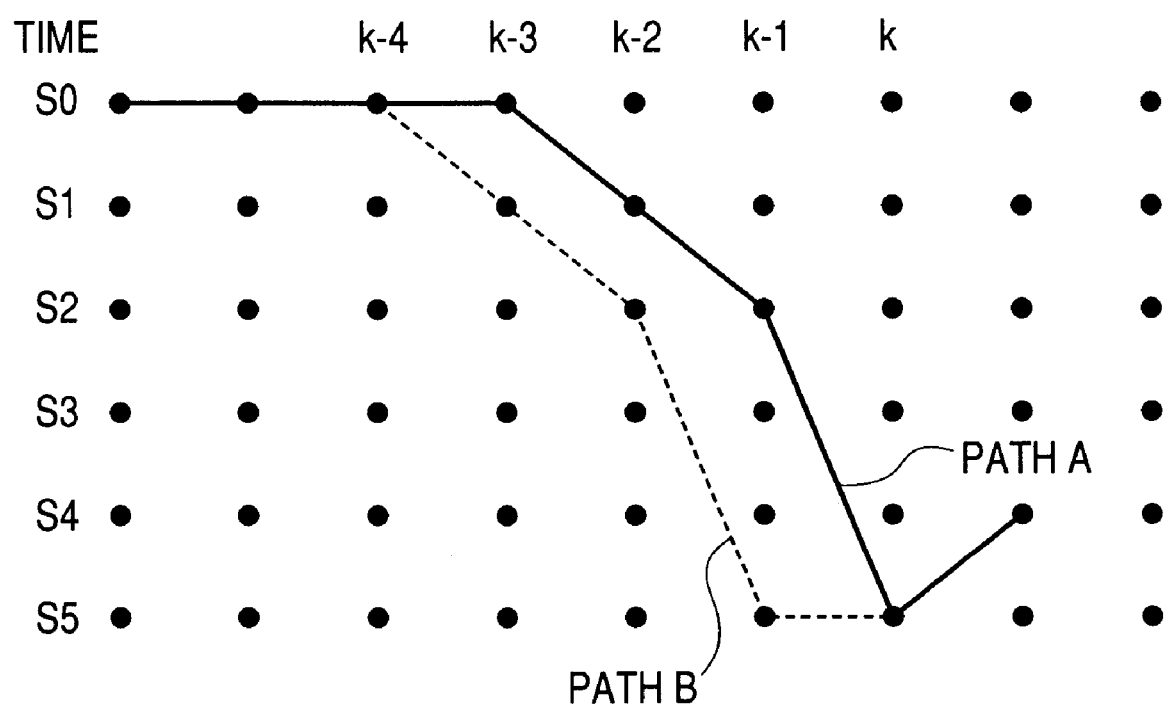
FIG. 10 is a diagram for explaining the operation of an evaluation index generator.
Figure 11:
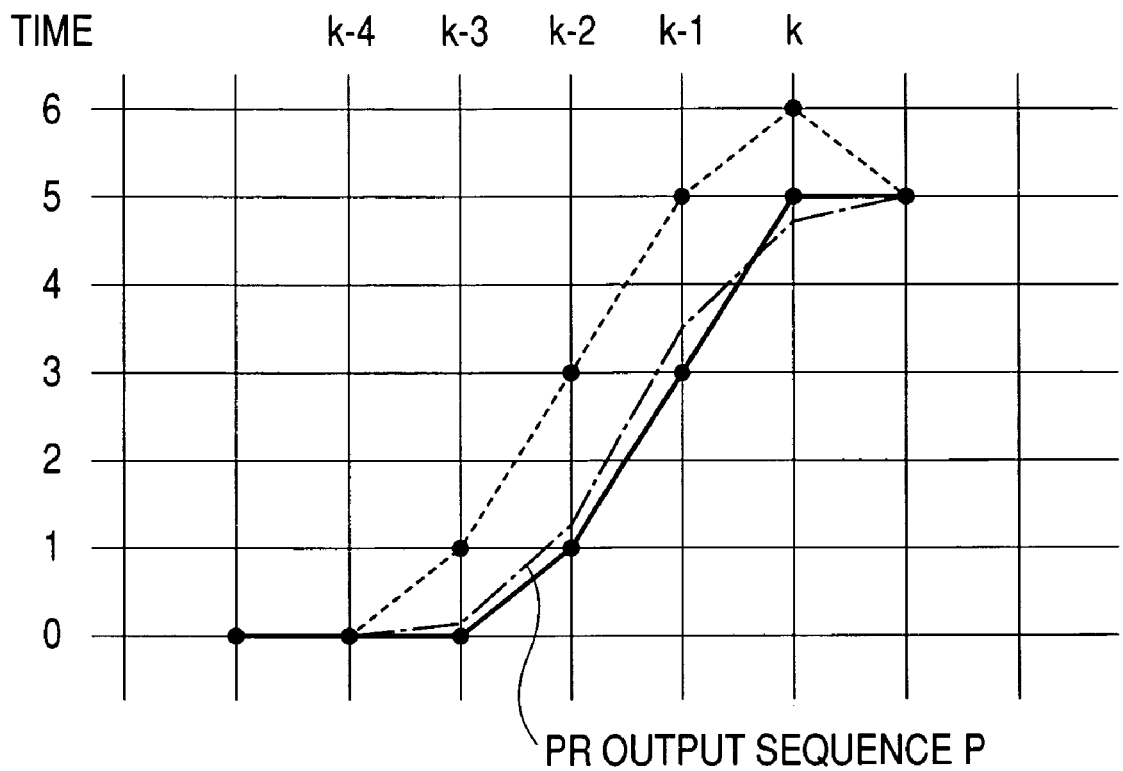
FIG. 11 is a diagram for explaining the operation of an evaluation index generator.

More specifically, when paths A and B such as shown in FIG. 10 are detected by the above-described method, they are confluent in the state S5 at time k and, therefore, the metric value is computed by the following equation to determine the surviving path.

$$m_5[k] = \min\{m_5[k-1] + (y[k]-a_6)^2 + k_7, m_2[k-1] + (y[k]-a_5)^2 + k_8\}$$

(5)

where the first term in min { } is the metric value corresponding to the path B, and the second term is the metric value corresponding to the path A. Here, the correcting metric values $\gamma_{An}$ and $\gamma_{Bn}$ (An =A1 to A8, Bn=B1 to B8) are generated in the correcting metric generation section 34. In this case, the following values are obtained as $\gamma_A$ and $\gamma_B$.

$$\gamma_A = -0.3$$

$$\gamma_B = -0.5$$

In this case, the following values are set as $k_7$ and $k_8$ in equation (5).

$$k_7 = -0.5$$

$$k_8 = -0.3$$

Thus, the path metric at the confluent point in the predetermined pattern is corrected on the basis of the metric difference information to improve the accuracy of selection of the surviving path.

As described above, each pattern in FIG. 4 is a combination of patterns giving the minimum Euclidean distance in PRML of PR (1, 2, 2, 1). Accordingly, the probability of an error with each pattern in FIG. 4 is high.

In the apparatus of this embodiment, the metric difference is held with respect to each of predetermined patterns and statistical processing is performed on the metric difference to compute a metric correcting value. However, the metric correcting value may be sequentially updated on the basis of the metric difference with respect to each of the predetermined patterns to enable the correcting value to be reflected in metric computation at the time of Viterbi decoding.

As shown in this embodiment, in a case where a pattern from which an error can occur easily is generated, the metric value is corrected on the basis of metric difference information corresponding to the condition of the actual reproduced signal to improve the performance of Viterbi decoding.

According to the present invention, as described above, since parameters of the Viterbi decoder are corrected on the basis of the evaluation index using the metric difference indicating the Viterbi decision accuracy, there is obtained the effect that a nonlinear distortion due to intersymbol interference or the like can be corrected.

Further, by updating the reference amplitude values in the Viterbi decoding operation as a parameter to be corrected, it is possible to optimize the decoding operation corresponding to the reproduced signal and reduce the error rate.

Moreover, by correcting the metric value in the Viterbi decoding operation as a parameter to be corrected, it is possible to improve the Viterbi decoding detection accuracy with respect to patterns from which an error can occur easily.

Further, by making parameter correction when a predetermined decoding pattern is generated, it is possible to make a correction corresponding to the predetermined pattern from which an error can occur easily, thereby attaining suitable decoding operation corresponding to the characteristics of the reproduced signal.

What is claimed is:

1. An information processing apparatus comprising:
   a maximum likelihood decoder which binarizes a reproduced signal by maximum likelihood decoding in which a state transition sequence most probable to be correct of m kinds of state transition sequences from a first state at time k–n to a second state at time k is selected;
   a computation device which computes a metric difference between the most probable state transition sequence and a second most probable state transition sequence at a predetermined time; and
   a parameter adjustment means of correcting a parameter of the maximum likelihood decoder on the basis of the metric difference to optimize maximum likelihood decoding operation.

2. The apparatus according to claim 1, wherein the parameter comprises a reference amplitude value of the maximum likelihood decoder.

3. The apparatus according to claim 1, wherein the parameter comprises a correcting value added to a path metric value representing the probability of correctness of each of possible state transition sequences at each time.

4. The apparatus according to claim 1, wherein the predetermined time is a time determined by occurrence of a particular one of the state transition sequences.

* * * * *